(12) United States Patent
      Garikapati et al.

(10) Patent No.: US 12,649,483 B2
(45) Date of Patent: Jun. 9, 2026

(54) DYNAMICALLY SETTING A LIMIT THAT EFFECTS AN ACTUATOR OF A VEHICLE

(71) Applicant: Toyota Jidosha Kabushiki Kaisha, Toyota (JP)

(72) Inventors: Divya Garikapati, San Jose, CA (US); Yiting Liu, Dublin, CA (US); Zhaoyuan Huo, Cupertino, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 146 days.

(21) Appl. No.: 18/422,191

(22) Filed: Jan. 25, 2024

(65) Prior Publication Data
      US 2025/0206326 A1      Jun. 26, 2025

Related U.S. Application Data

(60) Provisional application No. 63/613,793, filed on Dec. 22, 2023.

(51) Int. Cl.
      *B60W 50/12*          (2012.01)
(52) U.S. Cl.
      CPC ......... *B60W 50/12* (2013.01); *B60W 2510/18* (2013.01); *B60W 2510/20* (2013.01); *B60W 2540/22* (2013.01)
(58) Field of Classification Search
      CPC ............. B60W 50/12; B60W 2510/18; B60W 2510/20; B60W 2540/22

(Continued)

(56) References Cited

U.S. PATENT DOCUMENTS 5,969,969 A * 10/1999 Ejiri ....................... G08G 1/168
                                                          701/515
10,275,797 B2 * 4/2019 Freytag .................. G05D 1/247
(Continued)

FOREIGN PATENT DOCUMENTS

WO        2023128406 A1     7/2023

OTHER PUBLICATIONS

De Gelder et al., "Towards an Ontology for Scenario Definition for the Assessment of Automated Vehicles: An Object-Oriented Framework," IEEE Transactions on Intelligent Vehicles, vol. 7, No. 2, pp. 300-314, Jun. 2022.

(Continued)

*Primary Examiner* — Logan M Kraft
*Assistant Examiner* — John D Bailey
(74) *Attorney, Agent, or Firm* — Christopher G. Darrow; Darrow Mustafa PC

(57)                    ABSTRACT
A system for setting a limit that effects an actuator of a vehicle can include a processor and a memory. The memory can store a communications module, a scenario identification module, a limits catalog retrieval module, and a limits setting module. The communications module can receive, from an external source and before starting a trajectory of the vehicle, a first limits catalog, that effects the actuator, cross-indexed by scenarios likely along the trajectory and risks associated with the scenarios. The first limits catalog can be produced from information from a plurality of vehicles. The scenario identification module can identify a current scenario. The limits catalog retrieval module can retrieve, based on the current scenario, a second limits catalog that effects the actuator. The limits setting module can set, based on the current scenario, the first limits catalog, and the second limits catalog, the limit.

20 Claims, 4 Drawing Sheets

(58) Field of Classification Search
USPC .......................................................... 701/41
See application file for complete search history.

(56) References Cited

U.S. PATENT DOCUMENTS

| | | | | |
|---|---|---|---|---|
| 10,759,440 | B2 * | 9/2020 | Choo | B60W 40/09 |
| 11,036,239 | B1 * | 6/2021 | Nickel | G01S 13/751 |
| 11,112,797 | B2 | 9/2021 | Bin-Nun | |
| 11,669,108 | B2 * | 6/2023 | Laws | B60W 10/04 |
| | | | | 701/41 |
| 11,678,599 | B2 * | 6/2023 | Birkland | B60W 40/068 |
| | | | | 701/41 |
| 11,691,619 | B2 * | 7/2023 | Kim | G06V 20/586 |
| | | | | 701/41 |
| 11,926,259 | B1 * | 3/2024 | Joo | G08G 1/0967 |
| 12,151,696 | B2 * | 11/2024 | Watari | G07C 9/38 |
| 2015/0210290 | A1 * | 7/2015 | Hemes | B60W 30/182 |
| | | | | 701/36 |
| 2017/0076600 | A1 * | 3/2017 | Scofield | B60W 40/04 |
| 2017/0080948 | A1 * | 3/2017 | Lubbers | B60W 50/14 |
| 2017/0137023 | A1 * | 5/2017 | Anderson | B60W 50/14 |
| 2018/0088574 | A1 * | 3/2018 | Latotzki | B60W 30/095 |
| 2018/0194349 | A1 * | 7/2018 | McGill, Jr. | B60W 60/0013 |
| 2018/0365533 | A1 * | 12/2018 | Sathyanarayana | G06N 20/00 |
| 2019/0047583 | A1 * | 2/2019 | Sikorski | B60W 50/085 |
| 2019/0232974 | A1 * | 8/2019 | Reiley | G06V 40/168 |
| 2019/0265699 | A1 * | 8/2019 | Yabuuchi | G08G 1/16 |
| 2019/0383627 | A1 * | 12/2019 | Nangeroni | B60W 50/0098 |
| 2020/0031371 | A1 * | 1/2020 | Soliman | B60W 10/04 |
| 2020/0086880 | A1 * | 3/2020 | Poeppel | B60T 8/17636 |
| 2020/0164891 | A1 * | 5/2020 | Bender | B60W 50/0098 |
| 2020/0189591 | A1 * | 6/2020 | Mellinger, III | B60W 10/04 |
| 2020/0242421 | A1 * | 7/2020 | Sobhany | G06N 20/00 |
| 2020/0362735 | A1 * | 11/2020 | Ravi | F01N 9/00 |
| 2021/0046932 | A1 * | 2/2021 | Kegelman | G08G 1/22 |
| 2021/0179127 | A1 * | 6/2021 | Lopez | B60W 30/09 |
| 2021/0272394 | A1 * | 9/2021 | Cella | G06Q 40/08 |
| 2022/0126864 | A1 * | 4/2022 | Moustafa | B60W 60/0013 |
| 2022/0136474 | A1 * | 5/2022 | Ostrowski | G06N 3/08 |
| | | | | 123/179.4 |
| 2022/0144310 | A1 * | 5/2022 | Hong | B60W 50/16 |
| 2022/0252416 | A1 * | 8/2022 | Wu | G01C 21/3492 |
| 2022/0262127 | A1 * | 8/2022 | Hechler | G06V 20/58 |
| 2023/0034871 | A1 * | 2/2023 | Wolff | A61B 5/1176 |
| 2023/0139711 | A1 * | 5/2023 | Keßler | B62D 5/04 |
| | | | | 701/41 |
| 2023/0140569 | A1 * | 5/2023 | Foster | B60W 30/146 |
| | | | | 701/400 |
| 2023/0192127 | A1 * | 6/2023 | Funke | B60W 30/025 |
| | | | | 701/25 |
| 2023/0211797 | A1 * | 7/2023 | Lee | B60W 50/0098 |
| | | | | 701/36 |
| 2023/0303090 | A1 * | 9/2023 | Patne | B60W 50/0097 |
| 2024/0025424 | A1 * | 1/2024 | Yuan | B60W 50/0098 |
| 2024/0253648 | A1 * | 8/2024 | El Amouri | B60W 50/16 |
| 2025/0018966 | A1 * | 1/2025 | Gronau | B60W 30/18109 |
| 2025/0108837 | A1 * | 4/2025 | Kempf | B60W 10/18 |
| 2025/0136131 | A1 * | 5/2025 | Lerner | B60W 60/00188 |
| 2025/0185995 | A1 * | 6/2025 | Ek Blohm | B60W 50/14 |

OTHER PUBLICATIONS

Kruber et al., "Unsupervised and Supervised Learning with Random Forest Algorithm for Traffic Scenario Clustering and Classification," 2019 IEEE Intelligent Vehicles Symposium (IV), pp. 2463-2470, 2019.

Garikapati et al., "Dynamic Control Limits Application Strategy For Safety-Critical Autonomy Features," 2022 IEEE 25th International Conference on Intelligent Transportation Systems (ITSC), pp. 695-702, 2022.

Xu et al., "Safe Vehicle Trajectory Planning in an Autonomous Decision Support Framework for Emergency Situations," Applied Sciences, vol. 11, No. 14, pp. 6373-6403, May 25, 2021.

Dion et al., "Programming Neural Networks Inference in a Safety-Critical Simulation-based Framework," found at https://www.researchgate.net/publication/369543338, pp. 1-12, Jun. 2022.

Kuo et al., "Uncertainty-aware Contact-safe Model-based Reinforcement Learning," IEEE Robotics and Automation Letters, vol. 6, No. 2, pp. 3918-3925, Apr. 2021.

Unknown, "Operational design domain," last accessed on Dec. 16, 2023, 4 pages, found at https://en.wikipedia.org/wiki/Operational_design_domain.

* cited by examiner

200

Processor
202

Communications
Module
206

Scenario
Identification
Module
208

Limits Catalog
Retrieval
Module
210

Limits
Setting
Module
212

Limits Catalog
Production
Module
214

Training
Module
216

System Configured
to Perform a
Decision Engine
Technique
218

Memory 204

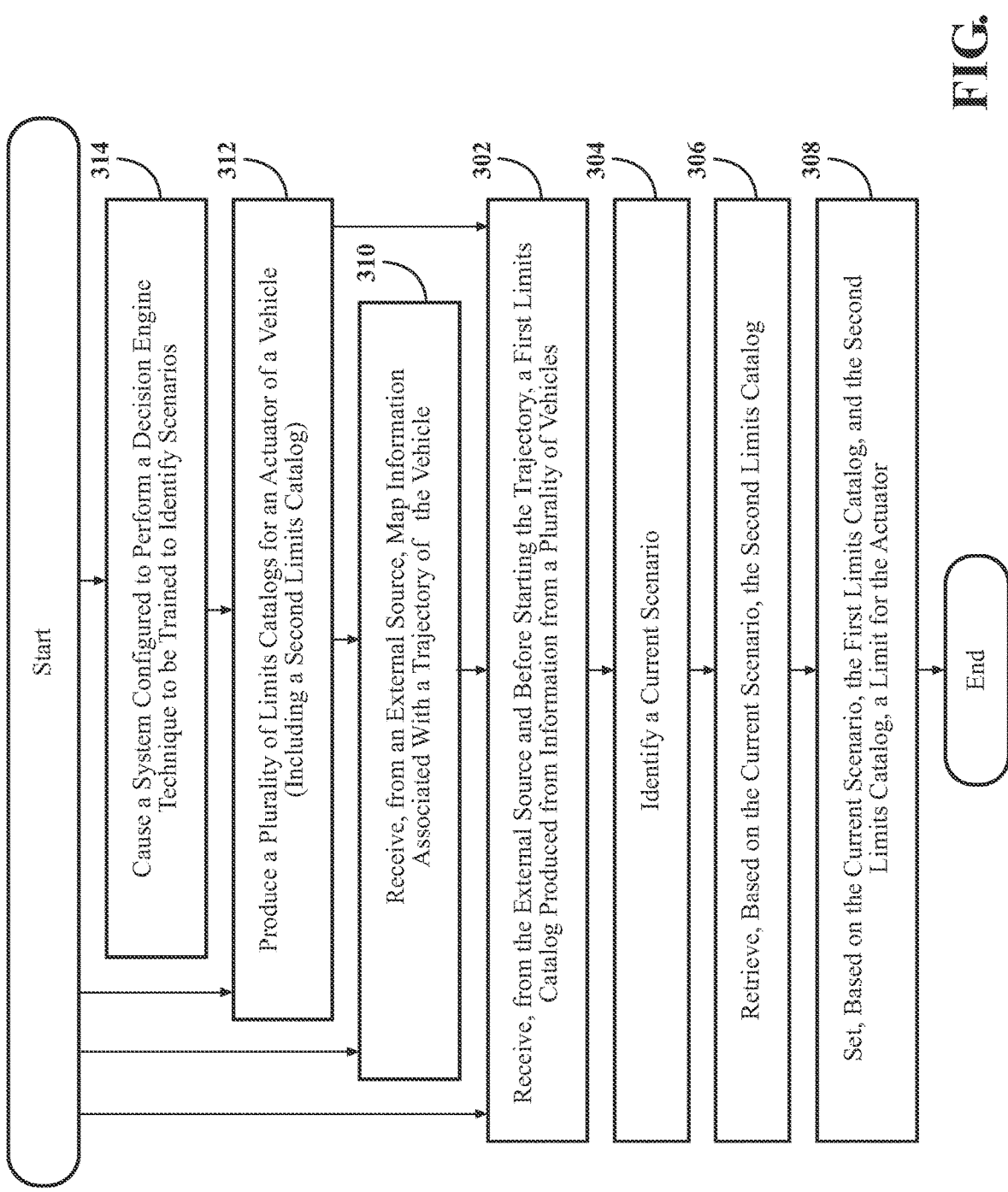

300

Start

314 — Cause a System Configured to Perform a Decision Engine Technique to be Trained to Identify Scenarios 312 — Produce a Plurality of Limits Catalogs for an Actuator of a Vehicle (Including a Second Limits Catalog)

310 — Receive, from an External Source, Map Information Associated With a Trajectory of the Vehicle 302 — Receive, from the External Source and Before Starting the Trajectory, a First Limits Catalog Produced from Information from a Plurality of Vehicles 304 — Identify a Current Scenario 306 — Retrieve, Based on the Current Scenario, the Second Limits Catalog 308 — Set, Based on the Current Scenario, the First Limits Catalog, and the Second Limits Catalog, a Limit for the Actuator End

FIG. 3

DYNAMICALLY SETTING A LIMIT THAT EFFECTS AN ACTUATOR OF A VEHICLE

CROSS-REFERENCE TO RELATED APPLICATIONS

This application claims the benefit of U.S. Provisional Application No. 63/613,793, filed Dec. 22, 2023, which is incorporated herein in its entirety by reference.

TECHNICAL FIELD

The disclosed technologies are directed to dynamically setting a limit that effects an actuator of a vehicle.

BACKGROUND

An automotive vehicle can include several car controls. The car controls can be configured to control components, of the automotive vehicle, configured to control aspects of a motion of the automotive vehicle. For example, such components can include one or more of a component configured to control a steering of one or more wheels of the automotive vehicle, a component configured to control a brake of the one or more wheels, a component configured to control a position of a throttle of the automotive vehicle (e.g., if the automotive vehicle is capable of being propelled by an internal combustion engine), or a component configured to control an amount of current conveyed to an electric drive motor of the automotive vehicle (e.g., if the automotive vehicle is capable of being propelled by an electric drive motor). A car control for such a component can include an actuator. A limit for the actuator can have a fixed setting so that control of a corresponding component can be constrained so that an aspect of the motion of the automotive vehicle, controlled by the corresponding component, can be such that an operation of the automotive vehicle is safe. However, in a situation in which the automotive vehicle is an automated (or autonomous) vehicle, safe operation can be a function of an operational design domain (ODD) under which the automated vehicle is expected to operate. If the automated vehicle is allowed to maneuver in different operating environments, then a limit appropriate for a more difficult operating environment may be too restrictive, at an expense of enjoying a performance capability of the automated vehicle, for a less difficult operating environment.

SUMMARY

In an embodiment, a system for setting a limit that effects an actuator of a vehicle can include a processor and a memory. The memory can store a communications module, a scenario identification module, a limits catalog retrieval module, and a limits setting module. The communications module can include instructions that, when executed by the processor, cause the processor to receive, from an external source and before starting a trajectory of the vehicle, a first limits catalog, for the actuator, cross-indexed by scenarios likely along the trajectory and risks associated with the scenarios. The first limits catalog can be produced from information from a plurality of vehicles. The scenario identification module can include instructions that, when executed by the processor, cause the processor to identify a current scenario. The limits catalog retrieval module can include instructions that, when executed by the processor, cause the processor to retrieve, based on the current scenario, a second limits catalog that effects the actuator. The limits setting module can include instructions that, when executed by the processor, cause the processor to set the limit based on the current scenario, the first limits catalog, and the second limits catalog.

In another embodiment, a method for setting a limit that effects an actuator of a vehicle can include receiving, by a processor, from an external source, and before starting a trajectory of the vehicle, a first limits catalog, for the actuator, cross-indexed by scenarios likely along the trajectory and risks associated with the scenarios. The first limits catalog can be produced from information from a plurality of vehicles. The method can include identifying, by the processor, a current scenario. The method can include retrieving, by the processor and based on the current scenario, a second limits catalog that effects the actuator. The method can include setting the limit, by the processor, based on the current scenario, the first limits catalog, and the second limits catalog.

In another embodiment, a non-transitory computer-readable medium for setting a limit for an actuator of a vehicle can include instructions that, when executed by one or more processors, cause the one or more processors to receive, from an external source and before starting a trajectory of the vehicle, a first limits catalog, that effects the actuator of the vehicle, cross-indexed by scenarios likely along the trajectory and risks associated with the scenarios. The first limits catalog can be produced from information from a plurality of vehicles. The non-transitory computer-readable medium can include instructions that, when executed by the one or more processors, cause the one or more processors to identify a current scenario. The non-transitory computer-readable medium can include instructions that, when executed by the one or more processors, cause the one or more processors to retrieve, based on the current scenario, a second limits catalog that effects the actuator. The non-transitory computer-readable medium can include instructions that, when executed by the one or more processors, cause the one or more processors to set the limit based on the current scenario, the first limits catalog, and the second limits catalog.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 3 includes a flow diagram that illustrates an example of a method that is associated with setting a limit that effects an actuator of a vehicle, according to the disclosed technologies.

3

Figure 4:
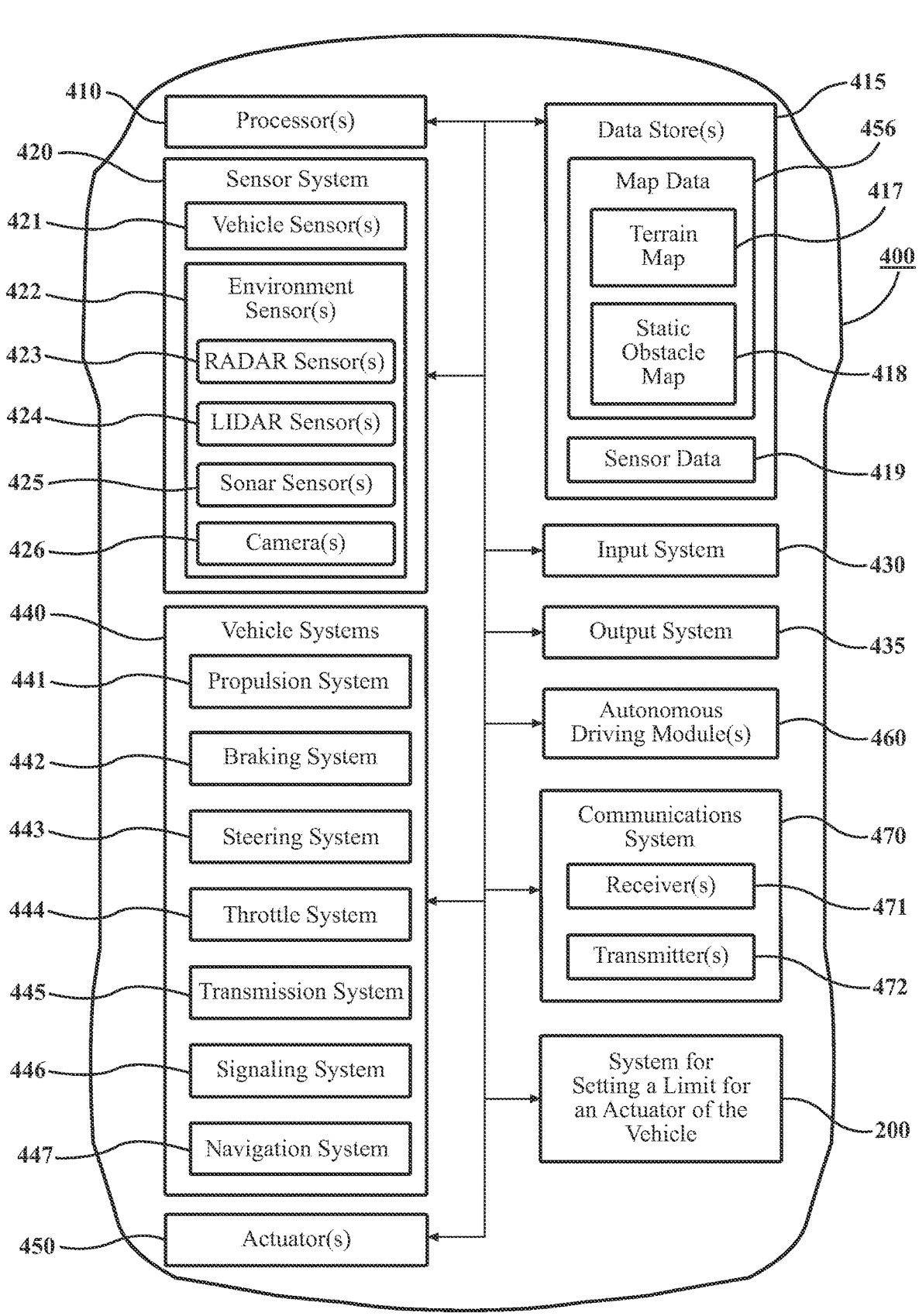

FIG. 4 includes a block diagram that illustrates an example of elements disposed on a vehicle, according to the disclosed technologies.

DETAILED DESCRIPTION

The disclosed technologies can dynamically set a limit that effects an actuator of a vehicle. For example, a system for setting the limit that effects the actuator can be disposed on the vehicle. A first limits catalog, that effects the actuator, can be received by the system, from an external source, and before starting a trajectory of the vehicle. Additionally, for example, map information associated with the trajectory can also be received from the external source or a different external source. For example, one or more of the external source or the different external source can be one or more servers. The first limits catalog can be cross-indexed by scenarios likely along the trajectory and risks associated with the scenarios. The first limits catalog can be produced from information from a plurality of vehicles. A current scenario can be identified. For example, the current scenario can be identified by values of parameters associated with one or more of one or more operating environments of the vehicle, one or more capabilities of the vehicle, or one or more states of an occupant of the vehicle. For example, the values of such parameters can be determined from an analysis of information received from one or more sensors disposed on the vehicle, a communications device disposed on the vehicle, or an analysis, performed on the vehicle, of such information. Based on the current scenario, a second limits catalog that effects the actuator can be retrieved. Based on the current scenario, the first limits catalog, and the second limits catalog, the limit can be set. Using this technique, as new scenarios are encountered along the trajectory, the limit can be set in a dynamic manner. Additionally, for example, a value of a limit in the first limits catalog can be a first limit, a value of a limit in the second limits catalog can be a second limit, the value of the first limit can be different from the value of the second limit, and the limit that effects the actuator can be set to be a more restrictive limit of the first limit and the second limit. Using this technique, the limit can be set in a manner that accounts for the information, from the plurality of vehicles, used to produce the first limits catalog.

For example, the limit that effects the actuator can be applied directly to the actuator or to a stage of an automated motion technology system associated with the actuator. For example, such a stage can include a perception stage, a trajectory planning stage, a motion controlling stage, or a safety controlling stage. For example, the perception stage can perform functions related to one or more of object detection, object prediction, or object tracking. For example, the trajectory planning stage can perform functions related to one or more of path planning, data-driven decision making, or a feasibility checking technique. For example, the feasibility checking technique can determine, in response to the one or more operating environments of the vehicle, one or more capabilities of the vehicle, or one or more states of an occupant of the vehicle, a trajectory deemed to be most feasible or appropriate and limits to be applied based on this trajectory. For example, the motion controlling stage can produce signals to cause a movement of an automated vehicle in accordance with this trajectory. For example, such signals can be governed with respect to one or more of a longitudinal control, a lateral control, a stability control, an envelope of control, or application of a control limit. For example, the safety controlling stage can determine if limits have been applied with respect to the motion of the automated vehicle and if such limits are within safe operational boundaries. In response to a determination that such limits are not within the safe operational boundaries, the safety controlling stage can apply a pre-coded set of limits.

Figure 1:
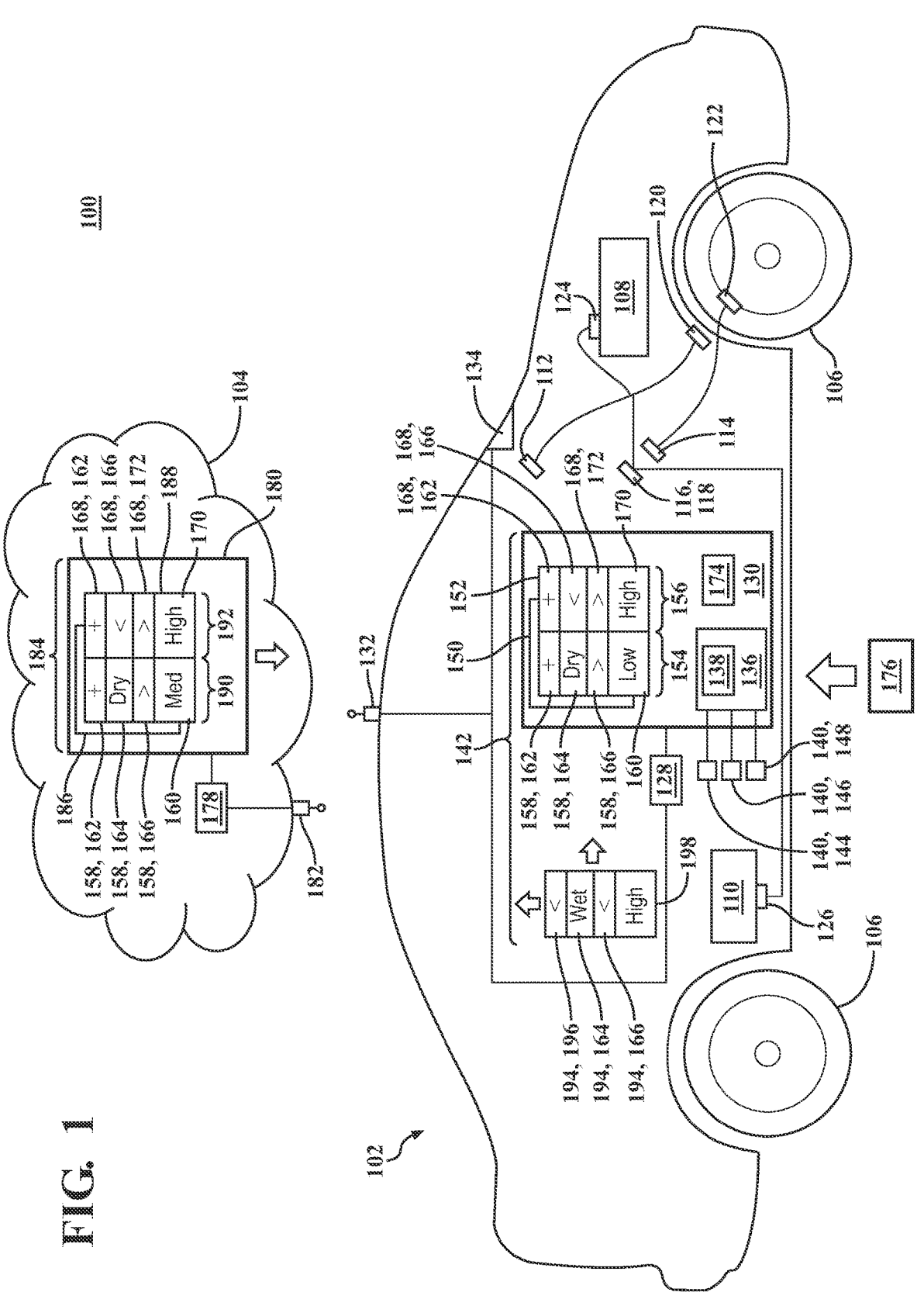
FIG. 1 includes a diagram that illustrates an example of an environment for setting a limit that effects an actuator of a vehicle, according to the disclosed technologies.

FIG. 1 includes a diagram that illustrates an example of an environment 100 for setting a limit that effects an actuator of a vehicle 102, according to the disclosed technologies. For example, the environment 100 can include the vehicle 102 and a server 104.

For example, the vehicle 102 can include one or more wheels 106 and at least one of an internal combustion engine 108 or an electric drive motor 110. For example, the vehicle 102 can include a component configured to control a steering 112 of the one or more wheels 106, a component configured to control a brake 114 of the one or more wheels 106, and at least one of a component configured to control a position of a throttle 116 of the vehicle 102 (e.g., if the vehicle 102 is capable of being propelled by the internal combustion engine 108) or a component configured to control an amount of current 118 conveyed to the electric drive motor 110 (e.g., if the vehicle 102 is capable of being propelled by the electric drive motor 110). For example, the vehicle 102 can include an actuator 120 for the component configured to control the steering 112, an actuator 122 for the component configured to control the brake 114, and at least one of an actuator 124 for the component configured to control the position of the throttle 116 or an actuator 126 for the component configured to control the amount of current 118. For example, the vehicle 102 can include a processor 128, a memory 130, a communications device 132, and one or more sensors 134.

For example, the vehicle 102 can include a system 136 for setting a limit that effects an actuator of the vehicle 102. For example, the system 136 can include a system 138 configured to perform a decision engine technique. For example, the system 136 can be configured to receive values of parameters 140, to produce a plurality of limits catalogs 142, and to store the plurality of limits catalogs 142. For example, the parameters 140 can include one or more parameters associated with one or more operating environments 144 of the vehicle 102, one or more parameters associated with one or more capabilities 146 of the vehicle 102, or one or more parameters associated with one or more states of an occupant 148 of the vehicle 102.

For example, each of the plurality of limits catalogs 142 can be associated with a scenario. For example, the plurality of limits catalogs 142 can include a limits catalog 150 and a limits catalog 152. For example, the limits catalog 150 can be associated with a scenario based on a traffic density. For example, the limits catalog 152 can be associated with a scenario based on a rate of rainfall. For example, the limits catalog 152 can include a first section 154 and a second section 156. For example, the first section 154 can be associated with a light rate of rainfall and the second section 156 can be associated with a heavy rate of rainfall. For example, each of the first section 154 and the second section 156 can cross-index values of parameters, of a set of parameters, with a classification of limits associated with the values of the parameters of the set of parameters. For example, the classification of the limits can be based on a degree of risk associated with the values of the parameters of the set of parameters. For example, the first section 154 can include a first set of parameters 158 and a first classification of the limits 160. For example, the first set of parameters 158 can include a determination of an occurrence of rainfall 162, a road condition 164, and a time to collision with an object 166. For example, the values of the parameters of the first set of parameters 158 can include that the determination of the occurrence of rainfall 162 is positive, the road condition 164 is dry, and the time to collision with the object 166 is greater than a first threshold. For example, the degree of risk associated with the values of the parameters of the first set of parameters 158 can be low and the first classification of the limits 160 can include the limit for the actuator, within the first classification of the limits 160, being set to a value that reflects the low degree of risk. For example, the second section 156 can include a second set of parameters 168 and a second classification of the limits 170. For example, the second set of parameters 168 can include the determination of an occurrence of rainfall 162, the time to collision with the object 166, and a speed of the object 172. For example, the values of the parameters of the second set of parameters 168 can include that the determination of the occurrence of rainfall 162 is positive, the time to collision with the object 166 is less than the first threshold, and the speed of the object 172 is greater than a second threshold. For example, the degree of risk associated with the values of the parameters of the second set of parameters 168 can be high and the second classification of the limits 170 can include the limit for the actuator, within the second classification of the limits 170, being set to a value that reflects the high degree of risk.

For example, the system 136 can include a set of weights 174 configured to be applied to one or more of the values of one or more of the parameters 140 to produce a limits catalog of the plurality of limits catalogs 142.

For example, the system 136 can be configured to receive a plurality of training scenarios 176 configured to be used to train the system 138, configured to perform the decision engine technique, to associate specific values of the parameters 140 with specific scenarios.

For example, the server 104 can include a processor 178, a memory 180, and a communications device 182. For example, the server 104 can be configured to store a plurality of limits catalogs 184. For example, the server 104 can be configured to receive limits catalogs, for inclusion in the plurality of limits catalogs 184, from a plurality of vehicles. For example, the plurality of vehicles can include the vehicle 102. For example, the server 104 can be configured to perform an analysis of the limits catalogs, received from the plurality of vehicles, so that the plurality of limits catalogs 184 can be prevented from including limits catalogs for redundant scenarios. For example, the server 104 can be configured to perform an analysis of the limits catalogs, received from the plurality of vehicles, so that limits included in a limits catalog associated with a specific scenario are most conservative or are based on information that is most current. Additionally, for example, the server 104 can be configured to perform an analysis of the limits catalogs, received from the plurality of vehicles, to determine if a limits catalog is associated with an existing scenario in the plurality of limits catalogs and, in response to a determination that the limits catalog is not associated with an existing scenario, identify a new scenario and associate the limits catalog with the new scenario.

For example, each of the plurality of limits catalogs 184 can be associated with a scenario. For example, the plurality of limits catalogs 184 can include a limits catalog 186 and a limits catalog 188. For example, the limits catalog 186 can be associated with the scenario based on the traffic density. For example, the limits catalog 188 can be associated with the scenario based on the rate of rainfall. For example, the limits catalog 188 can include a first section 190 and a second section 192. For example, the first section 190 can be associated with the light rate of rainfall and the second section 192 can be associated with the heavy rate of rainfall. For example, each of the first section 190 and the second section 192 can cross-index values of parameters, of a set of parameters, with a classification of limits associated with the values of the parameters of the set of parameters. For example, the classification of the limits can be based on a degree of risk associated with the values of the parameters of the set of parameters. For example, the first section 190 can include the first set of parameters 158 and the first classification of the limits 160. For example, the first set of parameters 158 can include the determination of the occurrence of rainfall 162, the road condition 164, and the time to collision with the object 166. For example, the values of the parameters of the first set of parameters 158 can include that the determination of the occurrence of rainfall 162 is positive, the road condition 164 is dry, and the time to collision with the object 166 is greater than a first threshold. For example, the degree of risk associated with the values of the parameters of the first set of parameters 158 can be medium and the first classification of the limits 160 can include the limit for the actuator, within the first classification of the limits 160, being set to a value that reflects the medium degree of risk. For example, the second section 192 can include the second set of parameters 168 and the second classification of the limits 170. For example, the second set of parameters 168 can include the determination of the occurrence of rainfall 162, the time to collision with the object 166, and the speed of the object 172. For example, the values of the parameters of the second set of parameters 168 can include that the determination of the occurrence of rainfall 162 is positive, the time to collision with the object 166 is less than the first threshold, and the speed of the object 172 is greater than the second threshold. For example, the degree of risk associated with the values of the parameters of the second set of parameters 168 can be high and the second classification of the limits 170 can include the limit for the actuator, within the second classification of the limits 170, being set to the value that reflects the high degree of risk.

Figure 2:
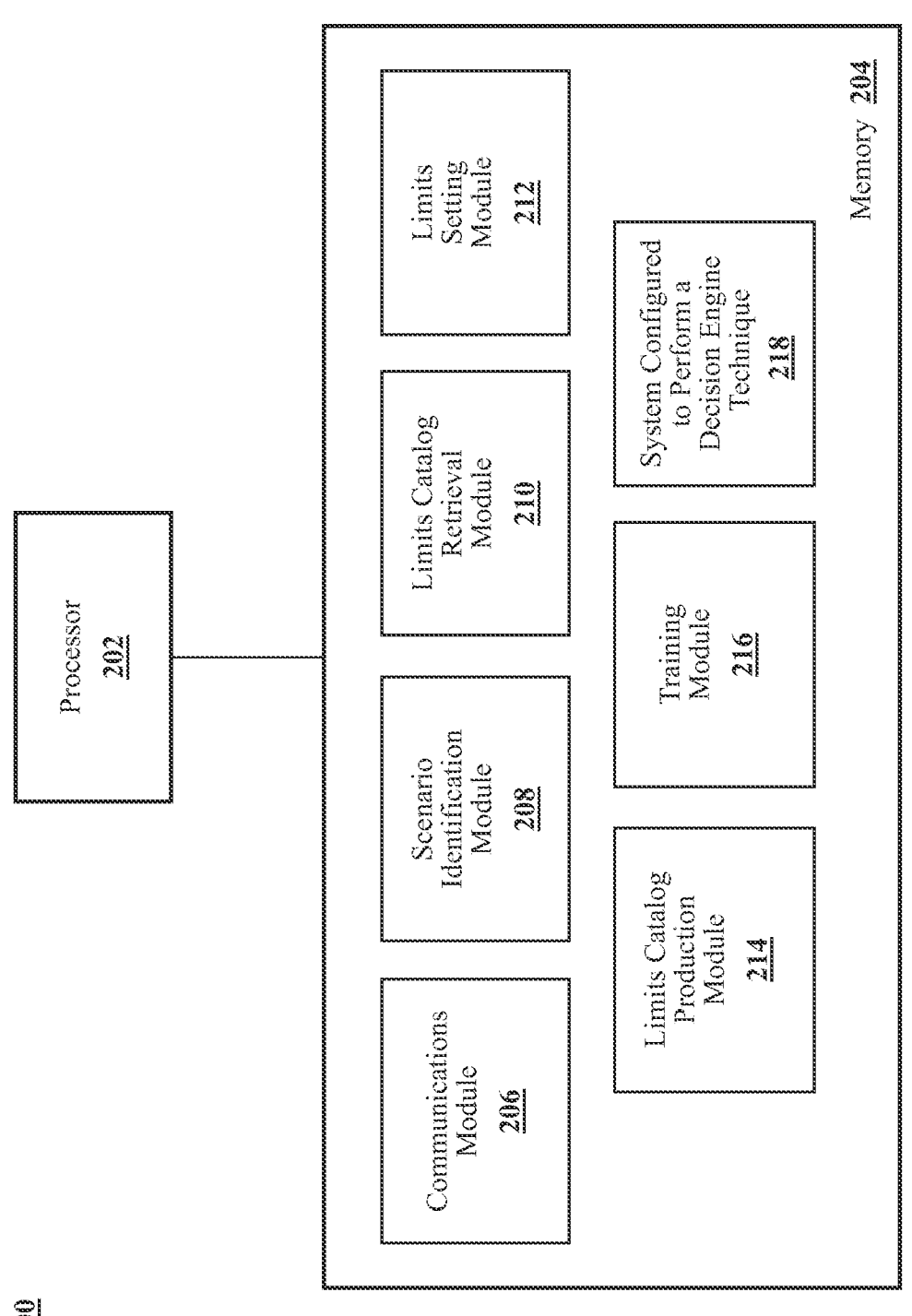
FIG. 2 includes a block diagram that illustrates an example of a system for setting a limit that effects an actuator of a vehicle, according to the disclosed technologies.

FIG. 2 includes a block diagram that illustrates an example of a system 200 for setting a limit for an actuator of a vehicle, according to the disclosed technologies. The system 200 can include, for example, a processor 202 and a memory 204. The memory 204 can be communicably coupled to the processor 202. For example, the memory 204 can store a communications module 206, a scenario identification module 208, a limits catalog retrieval module 210, and a limits setting module 212. For example, the system 200 can be the system 136 illustrated in FIG. 1.

For example, the communications module 206 can include instructions that function to control the processor 202 to receive, from an external source and before starting a trajectory of the vehicle, a first limits catalog that effects the actuator. For example, the first limits catalog can be cross-indexed by scenarios likely along the trajectory and risks associated with the scenarios. For example, the first limits catalog can be produced from information from a plurality of vehicles. Additionally, for example, the communications module 206 can further include instructions that function to control the processor 202 to receive, from the external source, map information associated with the trajectory. For example, the external source can be a server. For example, the server can be the server 104 illustrated in FIG. 1 and the first limits catalog can be the limits catalog 188 illustrated in FIG. 1.

For example, the scenario identification module 208 can include instructions that function to control the processor 202 to identify a current scenario. For example, the current scenario can be the scenario based on the rate of rainfall being light as described above.

For example, the limits catalog retrieval module 210 can include instructions that function to control the processor 202 to retrieve, based on the current scenario, a second limits catalog that effect the actuator. For example, the second limits catalog can be the limits catalog 152 illustrated in FIG. 1.

For example, the limits setting module 212 can include instructions that function to control the processor 202 to set, based on the current scenario, the first limits catalog, and the second limits catalog, the limit for the actuator. (Additionally or alternatively, the instructions to set the limit can set the limit for a stage of an automated motion technology system associated with the actuator.) For example, the actuator can include one or more of: (1) an actuator configured to control a steering of one or more wheels of the vehicle (e.g., the actuator 120 illustrated in FIG. 1), (2) an actuator configured to control a brake of the one or more wheels (e.g., the actuator 122 illustrated in FIG. 1), (3) an actuator configured to control a position of a throttle of the vehicle (e.g., the actuator 124 illustrated in FIG. 1) (e.g., if the vehicle is capable of being propelled by an internal combustion engine (e.g., the internal combustion engine 108 illustrated in FIG. 1)), or (4) an actuator configured to control an amount of current conveyed to an electric drive motor of the vehicle (e.g., the actuator 126 illustrated in FIG. 1) (e.g., if the vehicle is capable of being propelled by an electric drive motor (e.g., the electric drive motor 110 illustrated in FIG. 1)).

For example: (1) a value of a limit in the first limits catalog can be a first limit (e.g., the limit for the actuator, within the first classification of the limits 160 of the limits catalog 188 illustrated in FIG. 1, set to the value that reflects the medium degree of risk), (2) a value of a limit in the second limits catalog can be a second limit (e.g., the limit for the actuator, within the first classification of the limits 160 of the limits catalog 152 illustrated in FIG. 1, set to the value that reflects the low degree of risk), (3) the value of the first limit can be different from the value of the second limit, and (4) the setting the limit can include setting the limit to be a more restrictive limit of the first limit and the second limit (e.g., the value, within the first classification of the limits 160 of the limits catalog 188 illustrated in FIG. 1, which reflects the medium degree of risk). That is, in producing the first limits catalog, the server can have performed an analysis of the limits catalogs, received from the plurality of vehicles, and produced the first limits catalog so that the limit, included in the first limits catalog, is most conservative (e.g., the value, within the first classification of the limits 160 of the limits catalog 188 illustrated in FIG. 1, which reflects the medium degree of risk).

Additionally, in an implementation, for example, the memory 204 can further store a limits catalog production module 214. For example, the limits catalog production module 214 can include instructions that function to control the processor 202 to produce a plurality of limits catalogs. For example, the plurality of limits catalogs can include the second limits catalog. For example, the plurality of limits catalogs can be the plurality of limits catalogs 142 illustrated in FIG. 1. For example, the second limits catalog can be the limits catalog 152 illustrated in FIG. 1.

For example, the memory 204 can further store a system 218 configured to perform a decision engine technique. For example, the instructions to produce the plurality of limits catalogs can include instructions to produce, using a decision engine technique, the plurality of limits catalogs. For example, the decision engine technique can include one or more of a decision tree technique, a Random Forest technique, a Multi-Criteria Decision Making technique, a machine learning technique, an artificial intelligence technique, use of a neural network, or the like. For example, the system 218 configured to perform the decision engine technique can be the system 138 configured to perform the decision engine technique illustrated in FIG. 1.

For example, the instructions to produce the second limits catalog, of the plurality of limits catalogs, can include instructions to: (1) receive values of parameters, of a first set of parameters, associated with one or more of: (a) one or more operating environments of the vehicle, (b) one or more capabilities of the vehicle, or (c) one or more states of an occupant of the vehicle and (2) produce, based on the values of the parameters of the first set of parameters, a classification of limits associated with the values of the parameters of the first set of parameters. For example, the parameters associated with the one or more of: (1) the one or more operating environments of the vehicle can be the one or more parameters associated with the one or more operating environments 144 of the vehicle 102 illustrated in FIG. 1, (2) the one or more capabilities of the vehicle can be the one or more parameters associated with the one or more capabilities 146 of the vehicle 102 illustrated in FIG. 1, and (3) the one or more states of the occupant of the vehicle can be the one or more parameters associated with the one or more states of the occupant 148 of the vehicle 102 illustrated in FIG. 1. For example, the values of the first set of parameters can be the values of the first set of parameters 158 illustrated in FIG. 1. For example, the classification of the limits associated with the values of the parameters of the first set of parameters can be the first classification of the limits 160 illustrated in FIG. 1.

For example, the parameters associated with the one or more operating environments of the vehicle can include parameters associated with one or more of a weather, a lighting condition, a temperature, a map associated with the environment, a road geometry (e.g., slope, curvature, etc.), a road condition (e.g., dry, wet, snow, ice, sand, salt, etc.), communications connectivity, a zone associated with the environment (e.g., school, hospital, zone defined by a geofence, etc.), a lane marking, a traffic sign, a traffic signal, a road junction (e.g., an intersection, an interchange, etc.), a road structure (e.g., a bridge, a tunnel, etc.), a building, a street light, a structure associated with road work, an object, a distance to the object, a time to collision with the object, a speed of the object, a size of the object, a count of objects of a same type, a count of objects of different types, a presence of a special vehicle (e.g., a police vehicle, a fire truck, an ambulance, etc.), a prediction of an intent of another participant in traffic, or the like.

For example, the parameters associated with the one or more capabilities of the vehicle can include parameters associated with one or more of an in-scope evaluation of a capability of a system of the vehicle, a signal produced by a perception system of the vehicle, a torque force, a time to ramp to acceleration, a jerk limit, an upcoming maneuver of the vehicle (e.g., based on information from a map, produced by a trajectory planner, etc.), a feasibility of the trajectory, prognostic information, a failure prediction, diagnostic information, a fault detection, communications connectivity, or the like.

For example, the parameters associated with the one or more states of the occupant of the vehicle can include parameters associated with an attentiveness of the occupant (e.g., determined by an internal camera of the vehicle) or the like.

For example, the instructions to produce the second limits catalog can further include instructions to apply, based on the current scenario, one or more weights to one or more of the parameters associated with the one or more of the one or more operating environments of the vehicle, the one or more capabilities of the vehicle, or the one or more states of the occupant of the vehicle. For example, the one or more weights to be applied, based on the current scenario, to the one or more of the parameters associated with the one or more of the one or more operating environments of the vehicle, the one or more capabilities of the vehicle, or the one or more states of the occupant of the vehicle can be one or more weights of the set of weights 174 illustrated in FIG. 1.

For example, the classification of the limits can be based on a degree of risk associated with the values of the parameters of the first set of parameters.

For example, the classification of the limits can be one of a plurality of classifications. For example, the plurality of classifications can include: (1) a first classification associated with one or more of an emergency scenario or a performance-critical scenario (the one or more of the emergency scenario or the performance-critical scenario being a scenario that involves a sudden encounter with an obstacle (e.g., an encounter with a sudden popup obstacle or a racing vehicle)), (2) a second classification associated with a safety critical scenario that involves an avoidance of an unexpected obstacle (e.g., an unexpected obstacle or avoidance of a static obstacle), (3) a third classification associated with a nominal scenario in which a rate of motion along the trajectory is high (e.g., a highway trajectory with known obstacles), and (4) a fourth classification associated with a nominal scenario in which the rate of motion along the trajectory is low (e.g., an urban trajectory with no or minimal traffic and known obstacles).

Additionally or alternatively, for example, the classification of the limits can be one of a plurality of classifications. For example, the plurality of classifications can include: (1) a first classification in which the limit associated with the value of the parameter is a first limit and the first limit is associated with one or more of a capability of a vehicle system that includes the actuator or a physical limit of the vehicle system that includes the actuator, (2) a second classification in which the limit associated with the value of the parameter is a second limit and the second limit is between the first limit and a third limit, (3) a third classification in which the limit associated with the value of the parameter is the third limit and the third limit is associated with a safe operation of the vehicle, and (4) a fourth classification in which the limit associated with the value of the parameter is a fourth limit and the fourth limit is associated with a comfortable operation of the vehicle.

For example, the limits associated with the values of the parameters of the first set of parameters can be with respect to one or more of a longitudinal motion of the vehicle or a lateral motion of the vehicle.

For example, the instructions to produce the second limits catalog, of the plurality of limits catalogs, can further include instructions to: (1) receive values of parameters, of a second set of parameters, associated the one or more of: (a) the one or more operating environments of the vehicle, (b) the one or more capabilities of the vehicle, or (c) the one or more states of the occupant of the vehicle and (2) produce, based on the values of the parameters of the second set of parameters, a classification of limits associated with the values of the parameters of the second set of parameters.

For example, the parameters associated with the one or more of: (1) the one or more operating environments of the vehicle can be the one or more parameters associated with the one or more operating environments 144 of the vehicle 102 illustrated in FIG. 1, (2) the one or more capabilities of the vehicle can be the one or more parameters associated with the one or more capabilities 146 of the vehicle 102 illustrated in FIG. 1, and (3) the one or more states of the occupant of the vehicle can be the one or more parameters associated with the one or more states of the occupant 148 of the vehicle 102 illustrated in FIG. 1. For example, the values of the second set of parameters can be the values of the second set of parameters 168 illustrated in FIG. 1. For example, the classification of the limits associated with the values of the parameters of the second set of parameters can be the second classification of the limits 170 illustrated in FIG. 1.

For example, the instructions to produce the second limits catalog, of the plurality of limits catalogs, can further include instructions to associate the values of the parameters of the first set of parameters and the values of the parameters of the second set of parameters with the current scenario. For example: (1) the values of the parameters of the first set of parameters can be the values of the parameters of the first set of parameters 158 illustrated in FIG. 1, (2) the values of the parameters of the second set of parameters can be the values of the parameters of the second set of parameters 168 illustrated in FIG. 1, and (3) the scenario can be the scenario based on the rate of rainfall as described above.

Additionally, in an implementation, for example, the memory 204 can further store a training module 216. For example, the training module 216 can include instructions that function to control the processor 202 to cause a system configured to perform the decision engine technique to be trained to identify scenarios. For example, the system configured to perform the decision engine technique can be the system 138 illustrated in FIG. 1. For example, the instructions to cause the system configured to perform the decision engine technique to be trained to identify scenarios can be configured to receive the plurality of training scenarios 176 illustrated in FIG. 1.

Additionally, in an implementation, for example, the instructions to produce the plurality of limits catalogs can include instructions to: (1) receive values of parameters, (2) cause a system configured to perform the decision engine technique to perform an attempt to associate the values of the parameters with an existing scenario in the plurality of limits catalogs, (3) cause, in response to a failure of the attempt, the system configured to perform the decision engine technique to: (a) identify a new scenario, (b) associate the values of the parameters with the new scenario, and (c) produce, for inclusion in the plurality of limits catalogs, a new limits catalog, and (4) cause the new limits catalog to be transmitted to the external source.

With reference to FIG. 1, for example, a third set of parameters 194 can include a temperature 196, the road condition 164, and the time to collision with the object 166. For example, the values of the parameters of the third set of parameters 194 can include that the temperature 196 is less than a third threshold, the road condition 164 is wet, and the time to collision with the object 166 is less than the first threshold. For example, the system 138 configured to perform the decision engine technique can be caused to perform an attempt to associate the values of the parameters with an existing scenario in the plurality of limits catalog 142. In response to a failure of the attempt, the system 138 configured to perform the decision engine technique can be caused to: (1) identify a new scenario based on a probability of an existence of black ice, (2) associate the values of the parameters with the new scenario, and (3) produce, for inclusion in the plurality of limits catalogs 142, a new limits catalog 198. The new limits catalog 198 can be transmitted to the server 104.

FIG. 3 includes a flow diagram that illustrates an example of a method 300 that is associated with setting a limit that effects an actuator of a vehicle, according to the disclosed technologies. Although the method 300 is described in combination with the system 200 illustrated in FIG. 2, one of skill in the art understands, in light of the description herein, that the method 300 is not limited to being implemented by the system 200 illustrated in FIG. 2. Rather, the system 200 illustrated in FIG. 2 is an example of a system that may be used to implement the method 300. Additionally, although the method 300 is illustrated as a generally serial process, various aspects of the method 300 may be able to be executed in parallel.

In FIG. 3, in the method 300, at an operation 302, for example, the communications module 206 can receive, from an external source and before starting a trajectory of the vehicle, a first limits catalog that effects the actuator. For example, the external source can be a server. For example, the first limits catalog can be cross-indexed by scenarios likely along the trajectory and risks associated with the scenarios. For example, the first limits catalog can be produced from information from a plurality of vehicles.

At an operation 304, for example, the scenario identification module 208 can identify a current scenario.

At an operation 306, for example, the limits catalog retrieval module 210 can retrieve, based on the current scenario, a second limits catalog that effects the actuator.

At an operation 308, for example, the limits setting module 212 can set, based on the current scenario, the first limits catalog, and the second limits catalog, the limit for the actuator. (Additionally or alternatively, at the operation 308, the limits setting module 212 can set the limit for a stage of an automated motion technology system associated with the actuator.) For example, the actuator can include one or more of: (1) an actuator configured to control a steering of one or more wheels of the vehicle, (2) an actuator configured to control a brake of the one or more wheels, (3) an actuator configured to control a position of a throttle of the vehicle, or (4) an actuator configured to control an amount of current conveyed to an electric drive motor of the vehicle.

For example: (1) a value of a limit in the first limits catalog can be a first limit, (2) a value of a limit in the second limits catalog can be a second limit, (3) the value of the first limit can be different from the value of the second limit, and (4) the setting the limit can include setting the limit to be a more restrictive limit of the first limit and the second limit. That is, in producing the first limits catalog, the server can have performed an analysis of the limits catalogs, received from the plurality of vehicles, and produced the first limits catalog so that the limit, included in the first limits catalog, is most conservative.

Additionally, at an operation 310, for example, the communications module 206 can receive, from the external source, map information associated with the trajectory.

Additionally, at an operation 312, for example, the limits catalog production module 214 can produce a plurality of limits catalogs. For example, the plurality of limits catalogs can include the second limits catalog.

For example, at the operation 312, the limits catalog production module 214 can produce, using a decision engine technique, the plurality of limits catalogs. For example, the decision engine technique can include one or more of a decision tree technique, a Random Forest technique, a Multi-Criteria Decision Making technique, a machine learning technique, an artificial intelligence technique, use of a neural network, or the like.

For example, at the operation 312, the limits catalog production module 214 can produce the second limits catalog by: (1) receiving values of parameters, of a first set of parameters, associated with one or more of: (a) one or more operating environments of the vehicle, (b) one or more capabilities of the vehicle, or (c) one or more states of an occupant of the vehicle and (2) producing, based on the values of the parameters of the first set of parameters, a classification of limits associated with the values of the parameters of the first set of parameters.

For example, the parameters associated with the one or more operating environments of the vehicle can include parameters associated with one or more of a weather, a lighting condition, a temperature, a map associated with the environment, a road geometry (e.g., slope, curvature, etc.), a road condition (e.g., dry, wet, snow, ice, sand, salt, etc.), communications connectivity, a zone associated with the environment (e.g., school, hospital, zone defined by a geofence, etc.), a lane marking, a traffic sign, a traffic signal, a road junction (e.g., an intersection, an interchange, etc.), a road structure (e.g., a bridge, a tunnel, etc.), a building, a street light, a structure associated with road work, an object, a distance to the object, a time to collision with the object, a speed of the object, a size of the object, a count of objects of a same type, a count of objects of different types, a presence of a special vehicle (e.g., a police vehicle, a fire truck, an ambulance, etc.), a prediction of an intent of another participant in traffic, or the like.

For example, the parameters associated with the one or more capabilities of the vehicle can include parameters associated with one or more of an in-scope evaluation of a capability of a system of the vehicle, a signal produced by a perception system of the vehicle, a torque force, a time to ramp to acceleration, a jerk limit, an upcoming maneuver of the vehicle (e.g., based on information from a map, produced by a trajectory planner, etc.), a feasibility of the trajectory, prognostic information, a failure prediction, diagnostic information, a fault detection, communications connectivity, or the like.

For example, the parameters associated with the one or more states of the occupant of the vehicle can include parameters associated with an attentiveness of the occupant (e.g., determined by an internal camera of the vehicle) or the like.

For example, at the operation 312, the limits catalog production module 214 can further produce the second limits catalog by applying, based on the current scenario, one or more weights to one or more of the parameters associated with the one or more of the one or more operating environments of the vehicle, the one or more capabilities of the vehicle, or the one or more states of the occupant of the vehicle.

For example, the classification of the limits can be based on a degree of risk associated with the values of the parameters of the first set of parameters.

For example, the classification of the limits can be one of a plurality of classifications. For example, the plurality of classifications can include: (1) a first classification associated with one or more of an emergency scenario or a performance-critical scenario (the one or more of the emergency scenario or the performance-critical scenario being a scenario that involves a sudden encounter with an obstacle (e.g., an encounter with a sudden popup obstacle or a racing vehicle)), (2) a second classification associated with a safety critical scenario that involves an avoidance of an unexpected obstacle (e.g., an unexpected obstacle or avoidance of a static obstacle), (3) a third classification associated with a nominal scenario in which a rate of motion along the trajectory is high (e.g., a highway trajectory with known obstacles), and (4) a fourth classification associated with a nominal scenario in which the rate of motion along the trajectory is low (e.g., an urban trajectory with no or minimal traffic and known obstacles).

Additionally or alternatively, for example, the classification of the limits can be one of a plurality of classifications. For example, the plurality of classifications can include: (1) a first classification in which the limit associated with the value of the parameter is a first limit and the first limit is associated with one or more of a capability of a vehicle system that includes the actuator or a physical limit of the vehicle system that includes the actuator, (2) a second classification in which the limit associated with the value of the parameter is a second limit and the second limit is between the first limit and a third limit, (3) a third classification in which the limit associated with the value of the parameter is the third limit and the third limit is associated with a safe operation of the vehicle, and (4) a fourth classification in which the limit associated with the value of the parameter is a fourth limit and the fourth limit is associated with a comfortable operation of the vehicle.

For example, the limits associated with the values of the parameters of the first set of parameters can be with respect to one or more of a longitudinal motion of the vehicle or a lateral motion of the vehicle.

For example, at the operation 312, the limits catalog production module 214 can further produce the second limits catalog by: (1) receiving values of parameters, of a second set of parameters, associated the one or more of: (a) the one or more operating environments of the vehicle, (b) the one or more capabilities of the vehicle, or (c) the one or more states of the occupant of the vehicle and (2) producing, based on the values of the parameters of the second set of parameters, a classification of limits associated with the values of the parameters of the second set of parameters.

For example, at the operation 312, the limits catalog production module 214 can further produce the second limits catalog by associating the values of the parameters of the first set of parameters and the values of the parameters of the second set of parameters with the current scenario.

Additionally, at an operation 314, for example, the training module 216 can cause a system configured to perform the decision engine technique to be trained to identify scenarios.

For example, at the operation 312, the limits catalog production module 214 can produce the plurality of limits catalogs by: (1) receiving values of parameters, (2) causing a system configured to perform the decision engine technique to perform an attempt to associate the values of the parameters with an existing scenario in the plurality of limits catalogs, (3) causing, in response to a failure of the attempt, the system configured to perform the decision engine technique to: (a) identify a new scenario, (b) associate the values of the parameters with the new scenario, and (c) produce, for inclusion in the plurality of limits catalogs, a new limits catalog, and (4) causing the new limits catalog to be transmitted to the external source.

FIG. 4 includes a block diagram that illustrates an example of elements disposed on a vehicle 400, according to the disclosed technologies. As used herein, a "vehicle" can be any form of powered transport. In one or more implementations, the vehicle 400 can be an automobile. While arrangements described herein are with respect to automobiles, one of skill in the art understands, in light of the description herein, that embodiments are not limited to automobiles. For example, functions and/or operations of one or more of the vehicle 102 (illustrated in FIG. 1), can be realized by the vehicle 400.

In some embodiments, the vehicle 400 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 400 is performed according to inputs received from a user (e.g., human driver). In one or more arrangements, the vehicle 400 can be a conventional vehicle that is configured to operate in only a manual mode.

In one or more embodiments, the vehicle 400 can be an automated vehicle. As used herein, "automated vehicle" can refer to a vehicle that operates in an automated mode. As used herein, "automated mode" can refer to navigating and/or maneuvering the vehicle 400 along a travel route using one or more computing systems to control the vehicle 400 with minimal or no input from a human driver. In one or more embodiments, the vehicle 400 can be highly automated or completely automated. In one embodiment, the vehicle 400 can be configured with one or more semi-automated operational modes in which one or more computing systems perform a portion of the navigation and/or maneuvering of the vehicle along a travel route, and a vehicle operator (i.e., driver) provides inputs to the vehicle 400 to perform a portion of the navigation and/or maneuvering of the vehicle 400 along a travel route.

For example, Standard J3016 202104, Taxonomy and Definitions for Terms Related to Driving Automation Systems for On-Road Motor Vehicles, issued by the Society of Automotive Engineers (SAE) International on Jan. 16, 2014, and most recently revised on Apr. 30, 2021, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 400 can include various elements. The vehicle 400 can have any combination of the various elements illustrated in FIG. 4. In various embodiments, it may not be necessary for the vehicle 400 to include all of the elements illustrated in FIG. 4. Furthermore, the vehicle 400 can have elements in addition to those illustrated in FIG. 4. While the various elements are illustrated in FIG. 4 as being located within the vehicle 400, one or more of these elements can be located external to the vehicle 400. Furthermore, the elements illustrated may be physically separated by large distances. For example, as described, one or more components of the disclosed system can be implemented within the vehicle 400 while other components of the system can be implemented within a cloud-computing environment, as described below. For example, the elements can include one or more processors 410, one or more data stores 415, a sensor system 420, an input system 430, an output system 435, vehicle systems 440, one or more actuators 450, one or more automated driving modules 460, a communications system 470, and a system 200 for setting a limit for an actuator of the vehicle 400.

In one or more arrangements, the one or more processors 410 can be a main processor of the vehicle 400. For example, the one or more processors 410 can be an electronic control unit (ECU). For example, functions and/or operations of the processor 178 (illustrated in FIG. 1) or the processor 202 (illustrated in FIG. 2) can be realized by the one or more processors 410.

The one or more data stores 415 can store, for example, one or more types of data. The one or more data stores 415 can include volatile memory and/or non-volatile memory. Examples of suitable memory for the one or more data stores 415 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 415 can be a component of the one or more processors 410. Additionally or alternatively, the one or more data stores 415 can be operatively connected to the one or more processors 410 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation. For example, functions and/or operations of the memory 180 (illustrated in FIG. 1) or the memory 204 (illustrated in FIG. 2) can be realized by the one or more data stores 415.

In one or more arrangements, the one or more data stores 415 can store map data 416. The map data 416 can include maps of one or more geographic areas. In some instances, the map data 416 can include information or data on roads, traffic control devices, road markings, structures, features, and/or landmarks in the one or more geographic areas. The map data 416 can be in any suitable form. In some instances, the map data 416 can include aerial views of an area. In some instances, the map data 416 can include ground views of an area, including 360-degree ground views. The map data 416 can include measurements, dimensions, distances, and/or information for one or more items included in the map data 416 and/or relative to other items included in the map data 416. The map data 416 can include a digital map with information about road geometry. The map data 416 can be high quality and/or highly detailed.

In one or more arrangements, the map data 416 can include one or more terrain maps 417. The one or more terrain maps 417 can include information about the ground, terrain, roads, surfaces, and/or other features of one or more geographic areas. The one or more terrain maps 417 can include elevation data of the one or more geographic areas. The map data 416 can be high quality and/or highly detailed. The one or more terrain maps 417 can define one or more ground surfaces, which can include paved roads, unpaved roads, land, and other things that define a ground surface.

In one or more arrangements, the map data 416 can include one or more static obstacle maps 418. The one or more static obstacle maps 418 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 418 can have location data, size data, dimension data, material data, and/or other data associated with them. The one or more static obstacle maps 418 can include measurements, dimensions, distances, and/or information for one or more static obstacles. The one or more static obstacle maps 418 can be high quality and/or highly detailed. The one or more static obstacle maps 418 can be updated to reflect changes within a mapped area.

In one or more arrangements, the one or more data stores 415 can store sensor data 419. As used herein, "sensor data" can refer to any information about the sensors with which the vehicle 400 can be equipped including the capabilities of and other information about such sensors. The sensor data 419 can relate to one or more sensors of the sensor system 420. For example, in one or more arrangements, the sensor data 419 can include information about one or more lidar sensors 424 of the sensor system 420.

In some arrangements, at least a portion of the map data 416 and/or the sensor data 419 can be located in one or more data stores 415 that are located onboard the vehicle 400. Additionally or alternatively, at least a portion of the map data 416 and/or the sensor data 419 can be located in one or more data stores 415 that are located remotely from the vehicle 400.

The sensor system 420 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process. For example, functions and/or operations of the sensor 134 (illustrated in FIG. 1) can be realized by the sensor system 420.

In arrangements in which the sensor system 420 includes a plurality of sensors, the sensors can work independently from each other. Alternatively, two or more of the sensors can work in combination with each other. In such a case, the two or more sensors can form a sensor network. The sensor system 420 and/or the one or more sensors can be operatively connected to the one or more processors 410, the one or more data stores 415, and/or another element of the vehicle 400 (including any of the elements illustrated in FIG. 4). The sensor system 420 can acquire data of at least a portion of the external environment of the vehicle 400 (e.g., nearby vehicles). The sensor system 420 can include any suitable type of sensor. Various examples of different types of sensors are described herein. However, one of skill in the art understands that the embodiments are not limited to the particular sensors described herein.

The sensor system 420 can include one or more vehicle sensors 421. The one or more vehicle sensors 421 can detect, determine, and/or sense information about the vehicle 400 itself. In one or more arrangements, the one or more vehicle sensors 421 can be configured to detect and/or sense position and orientation changes of the vehicle 400 such as, for example, based on inertial acceleration. In one or more arrangements, the one or more vehicle sensors 421 can include one or more accelerometers, one or more gyroscopes, an inertial measurement unit (IMU), a dead-reckoning system, a global navigation satellite system (GNSS), a global positioning system (GPS), a navigation system 447, and/or other suitable sensors. The one or more vehicle sensors 421 can be configured to detect and/or sense one or more characteristics of the vehicle 400. In one or more arrangements, the one or more vehicle sensors 421 can include a speedometer to determine a current speed of the vehicle 400.

Additionally or alternatively, the sensor system 420 can include one or more environment sensors 422 configured to acquire and/or sense driving environment data. As used herein, "driving environment data" can include data or information about the external environment in which a vehicle is located or one or more portions thereof. For example, the one or more environment sensors 422 can be configured to detect, quantify, and/or sense obstacles in at least a portion of the external environment of the vehicle 400 and/or information/data about such obstacles. Such obstacles may be stationary objects and/or dynamic objects. The one or more environment sensors 422 can be configured to detect, measure, quantify, and/or sense other things in the external environment of the vehicle 400 such as, for example, lane markers, signs, traffic lights, traffic signs, lane lines, crosswalks, curbs proximate the vehicle 400, off-road objects, etc.

Various examples of sensors of the sensor system 420 are described herein. The example sensors may be part of the one or more vehicle sensors 421 and/or the one or more environment sensors 422. However, one of skill in the art understands that the embodiments are not limited to the particular sensors described.

In one or more arrangements, the one or more environment sensors 422 can include one or more radar sensors 423, one or more lidar sensors 424, one or more sonar sensors 425, and/or one more cameras 426. In one or more arrangements, the one or more cameras 426 can be one or more high dynamic range (HDR) cameras or one or more infrared (IR) cameras. For example, the one or more cameras 426 can be used to record a reality of a state of an item of information that can appear in the digital map.

The input system 430 can include any device, component, system, element, arrangement, or groups thereof that enable information/data to be entered into a machine. The input system 430 can receive an input from a vehicle passenger (e.g., a driver or a passenger). For example, the input system 430 can include or more of a steering wheel, an accelerator control pedal, a brake control pedal, a joystick-like control lever, a human machine interface, a button-activated interface, a voice-activated interface, or the like. The output system 435 can include any device, component, system, element, arrangement, or groups thereof that enable information/data to be presented to a vehicle passenger (e.g., a driver or a passenger). For example, the output system 435 can include one or more of a display, a speaker, an alarm, a haptic feedback device, a vibratory feedback device, or the like.

Various examples of the one or more vehicle systems 440 are illustrated in FIG. 4. However, one of skill in the art understands that the vehicle 400 can include more, fewer, or different vehicle systems. Although particular vehicle systems can be separately defined, each or any of the systems or portions thereof may be otherwise combined or segregated via hardware and/or software within the vehicle 400. For example, the one or more vehicle systems 440 can include a propulsion system 441, a braking system 442, a steering system 443, a throttle system 444, a transmission system 445, a signaling system 446, and/or the navigation system 447. Each of these systems can include one or more devices, components, and/or a combination thereof, now known or later developed. For example, functions and/or operations of one or more of the internal combustion engine 108 (illustrated in FIG. 1), the electric drive motor 110 (illustrated in FIG. 1), or the component configured to control the amount of current 118 conveyed to the electric drive motor 110 (illustrated in FIG. 1) can be realized by the propulsion system 441. For example, functions and/or operations of the component configured to control the brake 114 (illustrated in FIG. 1) can be realized by the braking system 442. For example, functions and/or operations of the component configured to control the steering 112 (illustrated in FIG. 1) can be realized by the steering system 443. For example, functions and/or operations of the component configured to control the position of the throttle 116 (illustrated in FIG. 1) can be realized by the throttle system 444.

The navigation system 447 can include one or more devices, applications, and/or combinations thereof, now known or later developed, configured to determine the geographic location of the vehicle 400 and/or to determine a travel route for the vehicle 400. The navigation system 447 can include one or more mapping applications to determine a travel route for the vehicle 400. The navigation system 447 can include a global positioning system, a local positioning system, a geolocation system, and/or a combination thereof.

The one or more actuators 450 can be any element or combination of elements operable to modify, adjust, and/or alter one or more of the vehicle systems 440 or components thereof responsive to receiving signals or other inputs from the one or more processors 410 and/or the one or more automated driving modules 460. Any suitable actuator can be used. For example, the one or more actuators 450 can include motors, pneumatic actuators, hydraulic pistons, relays, solenoids, and/or piezoelectric actuators. For example, functions and/or operations of one or more of the actuator 120 (illustrated in FIG. 1), the actuator 122 (illustrated in FIG. 1), the actuator 124 (illustrated in FIG. 1), the actuator 126 (illustrated in FIG. 1) can be realized by the one or more actuators 450.

The one or more processors 410 and/or the one or more automated driving modules 460 can be operatively connected to communicate with the various vehicle systems 440 and/or individual components thereof. For example, the one or more processors 410 and/or the one or more automated driving modules 460 can be in communication to send and/or receive information from the various vehicle systems 440 to control the movement, speed, maneuvering, heading, direction, etc. of the vehicle 400. The one or more processors 410 and/or the one or more automated driving modules 460 may control some or all of these vehicle systems 440 and, thus, may be partially or fully automated.

The one or more processors 410 and/or the one or more automated driving modules 460 may be operable to control the navigation and/or maneuvering of the vehicle 400 by controlling one or more of the vehicle systems 440 and/or components thereof. For example, when operating in an automated mode, the one or more processors 410 and/or the one or more automated driving modules 460 can control the direction and/or speed of the vehicle 400. The one or more processors 410 and/or the one or more automated driving modules 460 can cause the vehicle 400 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The communications system 470 can include one or more receivers 471 and/or one or more transmitters 472. The communications system 470 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 470 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies. For example, functions and/or operations of the communications device 132 (illustrated in FIG. 1) can be realized by the communications system 470.

Moreover, the one or more processors 410, the one or more data stores 415, and the communications system 470 can be configured to one or more of form a micro cloud, participate as a member of a micro cloud, or perform a function of a leader of a micro cloud. A micro cloud can be characterized by a distribution, among members of the micro cloud, of one or more of one or more computing resources or one or more data storage resources in order to collaborate on executing operations. The members can include at least connected vehicles.

The vehicle 400 can include one or more modules, at least some of which are described herein. The modules can be implemented as computer-readable program code that, when executed by the one or more processors 410, implement one or more of the various processes described herein. One or more of the modules can be a component of the one or more processors 410. Additionally or alternatively, one or more of the modules can be executed on and/or distributed among other processing systems to which the one or more processors 410 can be operatively connected. The modules can include instructions (e.g., program logic) executable by the one or more processors 410. Additionally or alternatively, the one or more data store 415 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 400 can include one or more automated driving modules 460. The one or more automated driving modules 460 can be configured to receive data from the sensor system 420 and/or any other type of system capable of capturing information relating to the vehicle 400 and/or the external environment of the vehicle 400. In one or more arrangements, the one or more automated driving modules 460 can use such data to generate one or more driving scene models. The one or more automated driving modules 460 can determine position and velocity of the vehicle 400. The one or more automated driving modules 460 can determine the location of obstacles, obstacles, or other environmental features including traffic signs, trees, shrubs, neighboring vehicles, pedestrians, etc.

The one or more automated driving modules 460 can be configured to receive and/or determine location information for obstacles within the external environment of the vehicle 400 for use by the one or more processors 410 and/or one or more of the modules described herein to estimate position and orientation of the vehicle 400, vehicle position in global coordinates based on signals from a plurality of satellites, or any other data and/or signals that could be used to determine the current state of the vehicle 400 or determine the position of the vehicle 400 with respect to its environment for use in either creating a map or determining the position of the vehicle 400 in respect to map data.

The one or more automated driving modules 460 can be configured to determine one or more travel paths, current automated driving maneuvers for the vehicle 400, future automated driving maneuvers and/or modifications to current automated driving maneuvers based on data acquired by the sensor system 420, driving scene models, and/or data from any other suitable source such as determinations from the sensor data 419. As used herein, "driving maneuver" can refer to one or more actions that affect the movement of a vehicle. Examples of driving maneuvers include: accelerating, decelerating, braking, turning, moving in a lateral direction of the vehicle 400, changing travel lanes, merging into a travel lane, and/or reversing, just to name a few possibilities. The one or more automated driving modules 460 can be configured to implement determined driving maneuvers. The one or more automated driving modules 460 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 460 can be configured to execute various vehicle functions and/or to transmit data to, receive data from, interact with, and/or control the vehicle 400 or one or more systems thereof (e.g., one or more of vehicle systems 440). For example, functions and/or operations of an automotive navigation system can be realized by the one or more automated driving modules 460.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-4, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component (e.g., a central processing unit (CPU), a graphics processing unit (GPU), a field-programmable gate array (FPGA), or the like) that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:

a processor; and a memory storing:

a communications module including instructions that, when executed by the processor, cause the processor to receive, from an external source and before starting a trajectory of a vehicle, a first limits catalog, that effects an actuator of the vehicle, cross-indexed by scenarios likely along the trajectory and risks associated with the scenarios, the first limits catalog produced from information from a plurality of vehicles;

a scenario identification module including instructions that, when executed by the processor, cause the processor to identify a current scenario;

a limits catalog production module including instructions that, when executed by the processor, cause the processor to produce, in response to a lack of an association between the current scenario and an existing scenario in a plurality of limits catalogs, a new limits catalog for the plurality of limits catalog;

a limits catalog retrieval module including instructions that, when executed by the processor, cause the processor to retrieve, from the plurality of limits catalogs and based on the current scenario, a second limits catalog that effects the actuator; and a limits setting module including instructions that, when executed by the processor, cause the processor to set, based on the current scenario, the first limits catalog, and the second limits catalog, a limit for the current scenario to be a more restrictive limit of a first limit, from the first limits catalog, or a second limit from the second limits catalog.

2. The system of claim 1, wherein the limits catalog production module further includes instructions to produce the plurality of limits catalogs.

3. The system of claim 2, wherein the instructions to produce the plurality of limits catalogs include instructions to produce, using a decision engine technique, the plurality of limits catalogs.

4. The system of claim 3, wherein the instructions to produce the second limits catalog, of the plurality of limits catalogs, include instructions to:

receive values of parameters, of a first set of parameters, associated with at least one of at least one operating environment of the vehicle, at least one capability of the vehicle, or at least one state of an occupant of the vehicle; and produce, based on the values of the parameters of the first set of parameters, a classification of limits associated with the values of the parameters of the first set of parameters.

5. The system of claim 4, wherein the instructions to produce the second limits catalog, of the plurality of limits catalogs, further include instructions to:

receive values of parameters, of a second set of parameters, associated with the at least one of the at least one operating environment of the vehicle, the at least one capability of the vehicle, or the at least one state of the occupant of the vehicle; and produce, based on the values of the parameters of the second set of parameters, a classification of limits associated with the values of the parameters of the second set of parameters.

6. The system of claim 5, wherein the instructions to produce the second limits catalog, of the plurality of limits catalogs, further include instructions to associate the values of the parameters of the first set of parameters and the values of the parameters of the second set of parameters with the current scenario.

7. The system of claim 6, wherein the memory further stores a training module including instructions that, when executed by the processor, cause the processor to cause a system configured to perform the decision engine technique to be trained to identify scenarios.

8. The system of claim 4, wherein the classification is based on a degree of risk associated with the values of the parameters of the first set of parameters.

9. The system of claim 8, wherein the classification is one of a plurality of classifications, the plurality of classifications including:

a first classification associated with at least one of an emergency scenario or a performance-critical scenario, the at least one of the emergency scenario or the performance-critical scenario being a scenario that involves a sudden encounter with an obstacle, a second classification associated with a safety critical scenario that involves an avoidance of an unexpected obstacle, a third classification associated with a nominal scenario in which a rate of motion along the trajectory is high, and a fourth classification associated with a nominal scenario in which the rate of motion along the trajectory is low.

10. The system of claim 8, wherein the classification is one of a plurality of classifications, the plurality of classifications including:

a first classification in which the limit associated with the value of the parameter is a first limit, the first limit being associated with at least one of a capability of a vehicle system that includes the actuator or a physical limit of the vehicle system that includes the actuator, a second classification in which the limit associated with the value of the parameter is a second limit, the second limit being between the first limit and a third limit, a third classification in which the limit associated with the value of the parameter is the third limit, the third limit being associated with a safe operation of the vehicle, and a fourth classification in which the limit associated with the value of the parameter is a fourth limit, the fourth limit being associated with a comfortable operation of the vehicle.

11. The system of claim 8, wherein the limits associated with the values of the parameters of the first set of parameters are with respect to at least one of a longitudinal motion of the vehicle or a lateral motion of the vehicle.

12. The system of claim 4, wherein the parameters associated with:

the at least one operating environment of the vehicle comprise parameters associated with at least one of a weather, a lighting condition, a temperature, a map associated with the environment, a road geometry, a road condition, communications connectivity, a zone associated with the environment, a lane marking, a traffic sign, a traffic signal, a road junction, a road structure, a building, a street light, a structure associated with road work, an object, a distance to the object, a time to collision with the object, a speed of the object, a size of the object, a count of objects of a same type, a count of objects of different types, a presence of a special vehicle, or a prediction of an intent of another participant in traffic, the at least one capability of the vehicle comprise parameters associated with at least one of an in-scope evaluation of a capability of a system of the vehicle, a signal produced by a perception system of the vehicle, a torque force, a time to ramp to acceleration, a jerk limit, an upcoming maneuver of the vehicle, a feasibility of the trajectory, prognostic information, a failure prediction, diagnostic information, a fault detection, or communications connectivity, and the at least one state of the occupant of the vehicle comprise parameters associated with an attentiveness of the occupant.

13. The system of claim 4, wherein the instructions to produce the second limits catalog further include instructions to apply, based on the current scenario, at least one weight to at least one of the parameters associated with the at least one of the at least one of the operating environment of the vehicle, the at least one capability of the vehicle, or the at least one state of the occupant of the vehicle.

14. The system of claim 3, wherein the decision engine technique comprises at least one of a decision tree technique, a Random Forest technique, a Multi-Criteria Decision Making technique, a machine learning technique, an artificial intelligence technique, or use of a neural network.

15. The system of claim 3, wherein the instructions to produce the plurality of limits catalogs include instructions to:

receive values of parameters;

cause a system configured to perform the decision engine technique to perform an attempt to associate the values of the parameters with the existing scenario in the plurality of limits catalogs; and cause, in response to a failure of the attempt, the system configured to perform the decision engine technique to:

identify a new scenario, associate the values of the parameters with the new scenario, and produce, for inclusion in the plurality of limits catalogs, the new limits catalog; and cause the new limits catalog to be transmitted to the external source.

16. The system of claim 1, wherein the communications module further includes instructions to receive, from the external source, map information associated with the trajectory.

17. The system of claim 1, wherein the actuator comprises at least one of:

an actuator configured to control a steering of at least one wheel of the vehicle, an actuator configured to control a brake of the at least one wheel, an actuator configured to control a position of a throttle of the vehicle, or an actuator configured to control an amount of current conveyed to an electric drive motor of the vehicle.

18. A method, comprising:

receiving, by a processor, from an external source, and before starting a trajectory of a vehicle, a first limits catalog, that effects an actuator of the vehicle, cross-indexed by scenarios likely along the trajectory and risks associated with the scenarios, the first limits catalog produced from information from a plurality of vehicles;

identifying, by the processor, a current scenario;

producing, by the processor and in response to a lack of an association between the current scenario and an existing scenario in a plurality of limits catalogs, a new limits catalog for the plurality of limits catalog;

retrieving, by the processor, from the plurality of limits catalogs, and based on the current scenario, a second limits catalog that effects the actuator; and setting, by the processor and based on the current scenario, the first limits catalog, and the second limits catalog, a limit for the current scenario to be a more restrictive limit of a first limit, from the first limits catalog, or a second limit from the second limits catalog.

19. The method of claim 18, wherein a value of the first limit is different from a value of the second limit.

20. A non-transitory computer-readable medium for setting a limit for an actuator of a vehicle, the non-transitory computer-readable medium including instructions that, when executed by one or more processors, cause the one or more processors to:

receive, from an external source and before starting a trajectory of the vehicle, a first limits catalog, that effects the actuator of the vehicle, cross-indexed by scenarios likely along the trajectory and risks associated with the scenarios, the first limits catalog produced from information from a plurality of vehicles;

identify a current scenario;

produce, in response to a lack of an association between the current scenario and an existing scenario in a plurality of limits catalogs, a new limits catalog for the plurality of limits catalog;

retrieve, from the plurality of limits catalogs and based on the current scenario, a second limits catalog that effects the actuator; and set, based on the current scenario, the first limits catalog, and the second limits catalog a limit for the current scenario to be a more restrictive limit of a first limit, from the first limits catalog, or a second limit from the second limits catalog.

* * * * *